United States Patent
Campbell et al.

[11] Patent Number: 6,131,089
[45] Date of Patent: Oct. 10, 2000

[54] PATTERN CLASSIFIER WITH TRAINING SYSTEM AND METHODS OF OPERATION THEREFOR

[75] Inventors: William Michael Campbell, Phoenix; Bruce Alan Fette, Mesa, both of Ariz.

[73] Assignee: Motorola, Inc., Schaumburg, Ill.

[21] Appl. No.: 09/072,171

[22] Filed: May 4, 1998

[51] Int. Cl.$^7$ ............... G06F 15/18; G10L 9/00

[52] U.S. Cl. ............... 706/20; 704/232

[58] Field of Search ............... 706/20; 704/232

[56] References Cited

U.S. PATENT DOCUMENTS

| | | | |
|---|---|---|---|
| 5,317,673 | 5/1994 | Cohen et al. | 704/232 |
| 5,381,513 | 1/1995 | Tsuboka | 704/232 |
| 5,390,136 | 2/1995 | Wang | 706/43 |
| 5,509,103 | 4/1996 | Wang | 704/232 |
| 5,594,834 | 1/1997 | Wang | 704/253 |
| 5,638,486 | 6/1997 | Wang et al. | 704/236 |
| 5,719,692 | 2/1998 | Cohen | 706/20 |
| 5,724,486 | 3/1998 | Wang | 706/47 |
| 5,734,793 | 3/1998 | Wang | 706/20 |
| 5,749,072 | 5/1998 | Mazurkiewicz et al. | 704/232 |
| 5,751,904 | 5/1998 | Inazumi | 704/232 |
| 5,818,963 | 10/1998 | Murdock et al. | 382/187 |
| 5,854,855 | 12/1998 | Errico et al. | 382/187 |
| 5,864,807 | 1/1999 | Campbell | 704/232 |
| 5,895,447 | 4/1999 | Ittycheriah et al. | 704/231 |
| 5,946,653 | 8/1999 | Campbell | 704/243 |
| 6,038,535 | 3/2000 | Campbell | 704/232 |

OTHER PUBLICATIONS

An article entitled "Continuous Speech Recognition", by Nelson Morgan and Herve Bourlard, from IEEE Signal Processing Magazine, May 1995, vol. 12, No. 3 ISSN 1053–5888.

Patrikar et al, "Pattern Classification Using Polynomial Networks", Electronics Letters, vol. 28 No. 12, Jun. 1992.

Gloger et al, "A Comparison of Gaussian Distribution and Polynomial Classifiers in Attidden Markov Model Based System for Recognition of Cursive Script", IEEE Proceedings of the 4th International Conference on Document Analysis and Recognition, Aug. 1997.

Patra, "Nonlinear Channel Equalization for QAM Signal Constellation Using Artificial Neural Networks", IEEE Transaction on System, Man, and Cybernetics, Apr. 1999.

Herries et al, "Characterisation of Agricultural Land. Using Signal Processing and Cognitive Learning Techniques", IEEE International Geoscience and Remote Sensing, Aug. 1997.

*Primary Examiner*—Kakali Chaki
*Assistant Examiner*—George Davis
*Attorney, Agent, or Firm*—Bradley J. Botsch; Gregory J. Gorrie

[57] ABSTRACT

Classifiers (110) and a comparator (112) perform an identification method (400) to identify a class as one of a predetermined set of classes. The identification method is based on determining the observation costs associated with the unidentified class. The identification method includes combining models representing the predetermined set of classes and the unidentified vectors representing the class. The predetermined class associated with the largest observation cost is identified as the class. Additionally, a unique, low-complexity training method (300) includes creating the models which represent the predetermined set of classes.

23 Claims, 3 Drawing Sheets

PATTERN CLASSIFIER WITH TRAINING SYSTEM AND METHODS OF OPERATION THEREFOR

FIELD OF THE INVENTION

This invention relates in general to the field of classifiers, and, in particular, to polynomial classifiers.

BACKGROUND OF THE INVENTION

Modern classifiers use techniques which are highly complex when high accuracy classification is needed. For example, a traditional neural network structure needing high accuracy also needs a complex structure to perform classification because of difficulty in grouping different classes within the neural network structure.

Additionally, in pattern recognition systems such as speech recognition, when a spoken command is identified, the spoken command is identified as one of a group of commands represented by a collection of models. Existing speech recognition systems require large amounts of processing and storage resources to identify a spoken command from a collection of models because the systems fail to use a combination of observation cost and state information to train low complexity models for identifying spoken commands.

Another problem with existing systems is that polynomial classifiers fail to use a combination of observation cost and state information when performing identification of classes (e.g., spoken commands, phoneme identification, digital images, radio signatures, communication channels, etc.). Additionally, a problem with training systems for polynomial classifiers is that existing systems do not train models using a method which exploits state information within training data.

Another problem with speech recognition systems is that such systems require accurate and low complexity methods for identifying an acoustic event. Typically, this is accomplished by separating speech into isolated phonetic units; for example, the word "happy" is represented as a sequence of four phonemes "H", "AE", "P", "IY". A popular technique for determining phonemes from a spoken word is to use the Hidden Markov Model (HMM). HMM's classify by incorporating a finite state machine in a stochastic framework. HMM's represent the order of the phonetic sounds by states. In an HMM, the probability that a certain sound has been emitted is encapsulated in observation probabilities. These probabilities are typically modeled by a Gaussian Mixture Model (GMM). A problem with GMM's is that GMM's only provide limited accuracy for text independent speaker verification. Another problem is that GMM's only provide a local optimum.

Thus, what is needed are a system and method for identifying classes from a collection of predetermined classes using limited processing and storage resources. What is also needed are a system and method which can train a set of predetermined classes using limited processing and storage resources. What is also needed are a system and method which combine observation cost and state information when identifying classes from a set of predetermined classes and training models which represent the set of predetermined classes. What is also needed are a system and method for identifying an acoustic event. Also needed are a system and method for accurately modeling the probability that a certain sound emitted for text independent speaker verification is encapsulated in observation probabilities. What is also needed are a system and method for modeling a global optimum that a certain sound which has been emitted is encapsulated in observation probabilities.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DETAILED DESCRIPTION OF THE PREFERRED EMBODIMENTS

Figure 1:
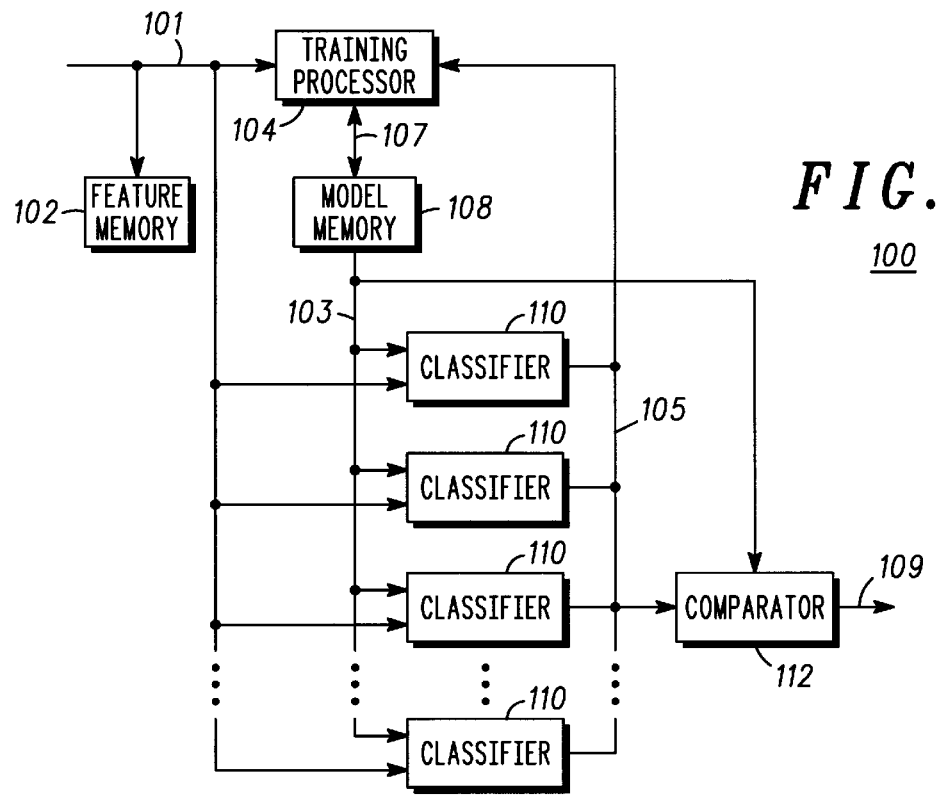
FIG. 1 illustrates a simplified block diagram of a classifier and training system in accordance with a preferred embodiment of the present invention.

The present invention includes, among other things, classifiers and a comparator to perform an identification method to identify a class as one of a predetermined set of classes. The identification method is based on determining the observation costs associated with the unidentified class. The identification method includes combining models representing the predetermined set of classes and the unidentified vectors representing the class. The predetermined class associated with the largest observation cost is identified as the class. Additionally, a unique, low-complexity training method includes creating the models which represent the predetermined set of classes.

Also, the present invention provides, a system and method for identifying classes from a collection of predetermined classes using limited processing and storage resources. The present invention also provides a system and method which can train a set of predetermined classes using limited processing and storage resources. The present invention also provides a system and method which combine observation cost and state information when identifying classes from a set of predetermined classes and training models which represent the set of predetermined classes. The present invention also provides a system and method for identifying an acoustic event. Also, the present invention provides a system and method for accurately modeling the probability that a certain sound emitted for text independent speaker verification is encapsulated in observation probabilities. The present invention also provides a system and method for modeling a global optimum that a certain sound has been emitted is encapsulated in observation probabilities.

A "class" is defined herein to mean a category (e.g., label) provided to a representation of an item. For example, the word "happy" is the class (e.g., label) associated with a feature vector representation of a speech sample of an individual speaking the word "happy". A "class" may also refer to a category (e.g., label) provided to a group of items (e.g., group of words). A "class label" is defined herein to mean a label associated with a class. A "model structure" is defined herein to mean a vector. When the vector is a model structure, the vector is a summation of a set of feature vectors which represent the class or classes associated therewith. A "model" is defined herein to mean a vector. When the vector is a class model, the vector has elements which are weighted based primarily on the class associated therewith. A "feature vector" is defined herein to mean a vector which represents the characteristics of an item. For example, when a removed silence speech sample is represented as a set of cepstral coefficients, the cepstral coefficients representing the speech sample are referred to as a "feature vector". Feature vectors may be used to represent, among other things, spoken commands, phonemes, radio signatures, communication channels, modulated signals, biometrics, facial images, and fingerprints.

FIG. 1 illustrates a simplified block diagram of a classifier and training system in accordance with a preferred embodiment of the present invention. Classifier and training system (CTS) 100 illustrates a system capable of identifying a class as at least one of a set of predetermined classes and training a set of models to represent the set of predetermined classes. In the preferred embodiment of the present invention, CTS 100 includes feature memory 102, training processor 104, model memory 108, classifiers 110, and comparator 112.

CTS 100 may be implemented in hardware, software, or a combination of hardware and software. In the preferred embodiment, CTS 100 is implemented in software.

Training processor 104 is preferably coupled to feature memory 102 via feature vector input 101. Training processor 104 is also coupled to model memory 108 via model memory input 107. Additionally, training processor 104 is connected to classifiers 110 via classifier outputs 105. Preferably, training processor 104 retrieves feature vectors from feature memory 102 and receives feature vectors from an external system via feature vector input 101. In the preferred embodiment, feature vectors stored in feature memory 102 represent a set of predetermined classes. Preferably, training processor 104 determines models for the set of predetermined classes based on feature vectors by performing a training procedure discussed below. In the preferred embodiment, training processor 104 associates feature vectors with predetermined states based on a training method performed by classifiers 110. When training for models is complete, training processor 104 preferably stores models in model memory 108.

Classifiers 110 are preferably coupled to model memory 108 via model input 103. Classifiers 110 receive feature vectors from feature vector input 101. Classifiers 110 are also coupled to comparator 112 via classifier outputs 105. In the preferred embodiment, each of classifiers 110 receives a model from model memory 108 and combines (e.g., performs a dot product) the model with unidentified feature vectors received via feature vector input 101. Preferably, the output from each of classifiers 110 is a total observation cost and a series of states representing that total observation cost. In the preferred embodiment, one observation cost is output for each set of unidentified feature vectors. Also, in another embodiment, one series of states is output for each set of unidentified feature vectors.

In the preferred embodiment, the plurality of classifiers 110 is equivalent to the number of predetermined classes. Preferably the number of classifiers 110 ranges between two and several thousand, although other numbers of classifiers 110 are possible based on the application.

Comparator 112 is coupled to classifiers 110 via classifier outputs 105. In the preferred embodiment, comparator 112 receives a total observation cost from each classifier 110. As discussed above, each observation cost is preferably associated with a set of unidentified feature vectors. Training processor 104 receives a series of states from each classifier 110. As discussed above, each series of states is preferably associated with a set of unidentified feature vectors. In the preferred embodiment, each unidentified feature vector is associated with one state. Unidentified feature vectors represent a class which is to be identified from a set of predetermined classes.

Comparator 112 preferably compares the total observation costs (TOCs) generated by classifiers 110. When comparator 112 receives TOCs associated with a set of unidentified feature vectors, comparator 112 preferably compares the costs to determine the largest cost. Based on the largest cost, comparator 112 preferably associates a predetermined class with the unidentified feature vectors representing a class to identify the class from the set of predetermined classes. Comparator 112 preferably outputs the identified class via class output 109.

Figure 2:
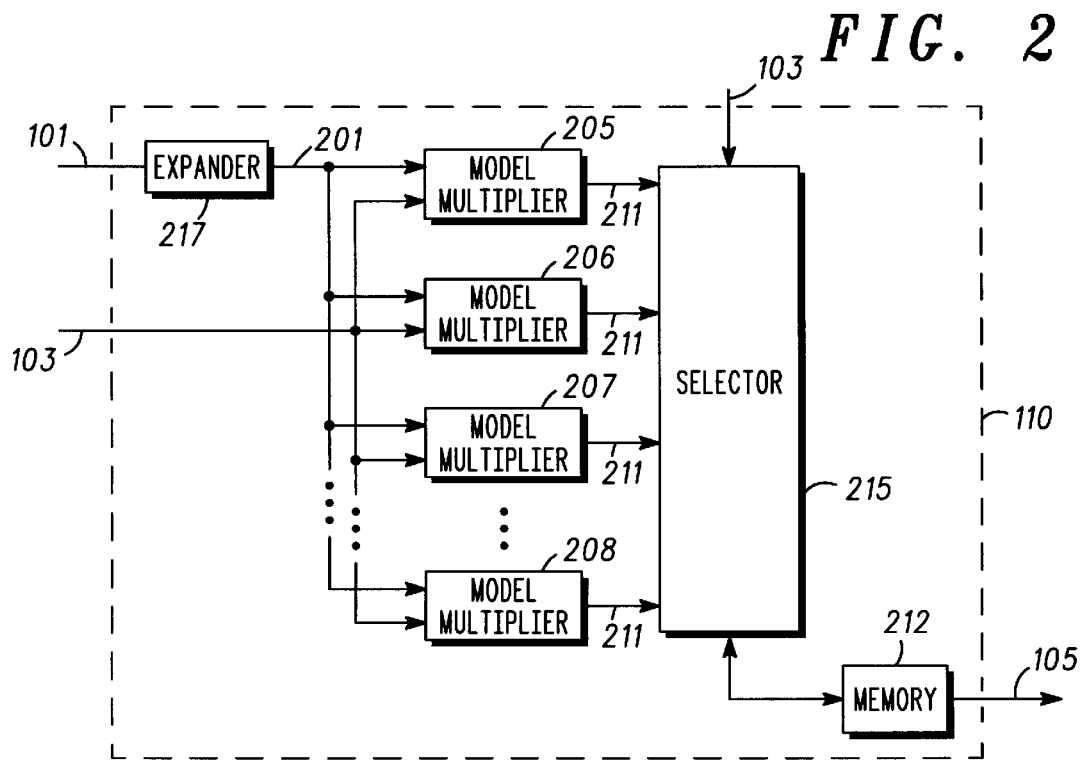
FIG. 2 illustrates a simplified block diagram of a classifier in accordance with a preferred embodiment of the present invention.

FIG. 2 illustrates a simplified block diagram of a classifier in accordance with a preferred embodiment of the present invention. Classifier 110 illustrates a classifier which accepts a set of models via model input 103 which represent a predetermined class, and feature vectors via feature input 101 which represent an unidentified class. In the preferred embodiment, feature vectors received via feature input 101 are received by expander 217 and output from expander 217 via expanded output 201. Expanded output 201 is preferably received by model multipliers 205–208. Expander 217 preferably performs a polynomial expansion for feature vectors as described below. Preferably, each of model multipliers 205–208 performs a dot product using a model and an expanded unidentified feature vector. For example, when classifier 110 contains models which represent the word "happy", each of the models operated on by model multipliers 205–208 preferably represents a phoneme for the word, such as: "H"—model multiplier 205; "AE"—model multiplier 206; "P"—model multiplier 207; "IY"—model multiplier 208. Each of model multipliers 205–208 preferably generates an observation cost based on the dot product associated therewith. The observation cost associated with performing each dot product is preferably conveyed to selector 215 via multiplier output 211.

Although the embodiment discussed above uses classifiers 110, other classifiers are suitable. For example, suitable classifiers may be found in U.S. patent application Ser. No. 09/020953, entitled "MULTIRESOLUTIONAL CLASSIFIER WITH TRAINING SYSTEM AND METHOD", which is assigned a filing date Feb. 9, 1998, or U.S. patent application Ser. No. 09/045361, entitled "TREE-STRUCTURED CLASSIFIER AND TRAINING APPARATUSES AND METHODS OF OPERATION THEREFOR", which is assigned a filing date Mar. 18, 1998, the subject matter of which is incorporated by reference herein.

The observation cost associated with each model multipliers 205–208 is preferably accumulated in memory 212 by selector 215 in accordance with the trellis diagram. Note that after processing five feature vectors, selector 215 (e.g., four state trellis diagram left-to-right model) is in a steady state in accordance with the trellis diagram.

As discussed above, selector 215 accumulates the total cost associated with each model multiplier and therefore each state. Selector 215 accumulates the total observation cost for each state in accordance with the trellis diagram. Again, for example, the observation cost from the "state 1" model multiplier (e.g., model multiplier 205) is equal to the previous total cost (initially zero) added to the observation cost determined by the "state 1" model multiplier. Since, according to the trellis diagram, state 1 only transitions to state 1 from state 1, the total observation cost for state 1 is the previous observation cost for state 1 added to the new observation cost for state 1. Per the trellis diagram, similar arguments hold for determining the total observation cost for each state in the predetermined class. In cases where the selector determines two total observation costs for a model multiplier (primarily because of different paths available in trellis diagram), the larger total observation cost is selected by selector 215 and this cost is determined to be the total observation cost for the associated state.

Although this embodiment of the invention discusses a left-to-right HMM model with four states, other HMMs are suitable. Some examples of suitable HMMs are ergodic HMM and arbitrary state transition matrix HMM.

In the preferred embodiment, selector 215 accumulates the observation cost associated with each of operations performed by each of model multipliers 205–208. Preferably, a total observation cost is accumulated for each of model multipliers 205–208. Preferably, selector 215 is coupled to memory 212. Selector 215 stores the total observation cost for each model multipliers 205–208 in memory 212. Preferably, each classifier 110 outputs the largest total observation cost stored in the associated memory 212 via classifier outputs 105.

In the preferred embodiment, during a training method described below, a series of states associated with the path through the model multipliers generating the largest observation costs, is accumulated in memory 212. Preferably, a state is accumulated in memory 212 for each of the unidentified feature vectors. Preferably, classifier 110 outputs the series of states via classifier output 105 and training processor 104 (FIG. 1) uses the series of states to train the models for each classifier 110.

Figure 3:
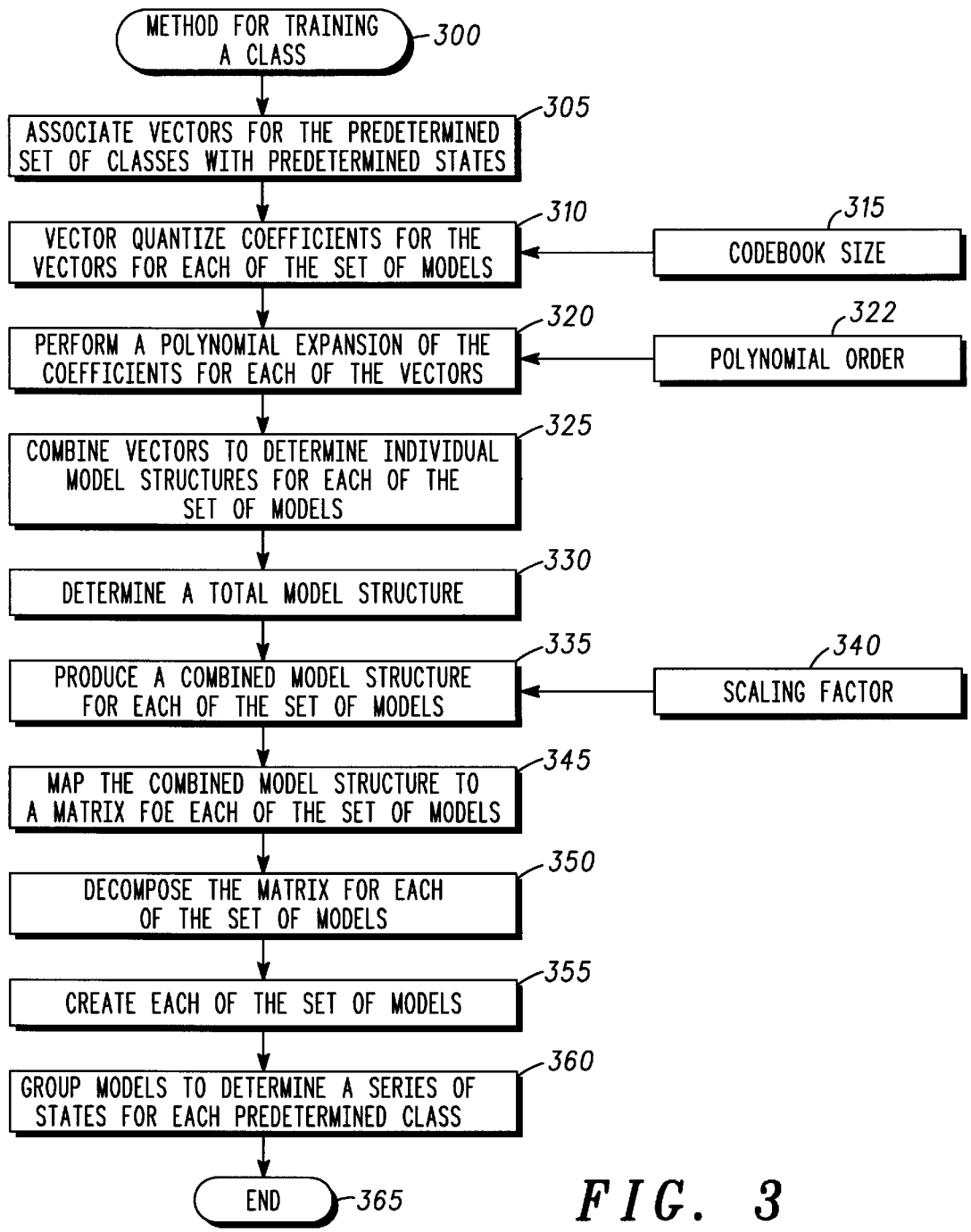
FIG. 3 is a flowchart illustrating a method for training a model for use in a classifier in accordance with a preferred embodiment of the present invention.

FIG. 3 is a flowchart illustrating a method for training a model for use in a classifier in accordance with a preferred embodiment of the present invention. In the preferred embodiment, method 300 is performed by a training processor to train (e.g., create) a set of models for use in an identification method (discussed below). Preferably, each of the set of models represents at least part of a class. Accordingly, each class represents, for example, spoken commands, phonemes, radio signatures, communication channels, modulated signals, biometrics, facial images, fingerprints, etc.

In step 305, vectors for the predetermined set of classes are associated with predetermined states. In the preferred embodiment, feature vectors which represent a set of predetermined classes are associated with states which represent the classes. For example, assume that one of the set of predetermined classes represents the word "happy". The word happy is preferably represented as a set of four phonemes; "H", "AE", "P", "IY". Each of the phonemes represents one of four states for the word. Feature vectors are associated with phonemes and phonemes are associated with one of four states to represent the word. States may be arbitrarily associated with each of the phonemes. For example, state 1 (S1) is associated with "H", state 2 (S2) is associated with "AE", state 3 (S3) is associated with "P", and state 4 (S4) is associated with "IY". Initially, feature vectors which represent each state may be divided up equally. For example, say "happy" is represented by four hundred feature vectors. Each of the four phonemes is assigned one hundred feature vectors. Preferably, these "divisions" of feature vectors are used to determine an initial set of models in accordance with method 300.

Further assume that another one of the set of predetermined classes represents the word "hat". The word hat is represented by a set of three phonemes; "H", "AE", "T". As discussed above, feature vectors are associated with phonemes which are also associated with states. Continuing with the above example, state 1 (S1) is assigned to "H", state 2 (S2) is assigned to "AE", and state 3 (S3) is assigned to "T".

In a preferred embodiment, when a set of feature vectors represents a class and each class represents a word, feature vectors are determined from a speech sample. A set of feature vectors is determined from a series of overlapping windows of sampled speech (e.g., Hamming windows). Preferably, a feature vector is created for each Hamming window, wherein, each Hamming window represents a speech sample having the silence removed.

In a preferred embodiment, an linear predictive (LP) analysis is performed and includes generating a predetermined number of coefficients for each Hamming window of the removed silence speech sample. Preferably the number of coefficients for the LP analysis is determined by the LP order. LP orders of 10, 12 and 16 are desirable however other LP orders may be used. A preferred embodiment uses an LP order of 12. In a preferred embodiment, step 305 generates 12 coefficients for every Hamming window (e.g., every 10 milliseconds, 30 milliseconds of removed silence speech). The result of step 305 may be viewed as a Z×12 matrix, where Z is the number of rows and 12 (the LP order) is the number of columns. Z is dependent on the length of the removed silence speech sample, and may be on the order of several hundred or thousand rows. The Z×12 matrix of step 305 may also be viewed as Z sets of LP coefficients. In this example, there are 12 LP coefficients for every Hamming window of the removed silence speech. Each set of LP coefficients represents a feature vector. Additionally, cepstral coefficients are determined from the LP coefficients.

In a preferred embodiment, step 305 includes performing a linear transform on the LP coefficients. Preferably, the linear transformation performed includes a cepstral analysis which separates unwanted from wanted information retaining information important to speech recognition. Performing the cepstral analysis is an optional part of step 305, however, for accurately identifying speech, cepstral analysis should be performed. Determining cepstral coefficients is a process known in the art. The result of performing the cepstral analysis may be viewed as a Z×24 matrix where 12 is the cepstral order. The cepstral order may be the same order as the LP order. The collection of feature vectors for the series of Hamming windows is comprised of either the sets of LP coefficients or cepstral coefficients associated therewith.

In step 305, each "training" feature vector is processed by its associated classifier 110. Based on a dot product operation for each training feature vector with the initial version of the predetermined models, a new series of states (e.g., sets of feature vectors for each model) is determined. As discussed above, processing for each training feature vector to determine which vectors represent which models is in accordance with the trellis diagram representing predetermined states (e.g., set of models) for a classifier. In the preferred embodiment, a fixed number of iterations are performed to associate feature vectors with states. For example, five iterations may be performed and the resulting series of states is used to retrain the models representing a predetermined class.

In another embodiment, iterations are performed to associate feature vectors with states until a predetermined percentage of states are unchanged from one iteration to the next iteration. For example, if a set of ten feature vectors represented two phonemes, and when performing two sequential iterations a less than 10% change occurred in the segmentation of feature vectors between phonemes, the segmentation of feature vectors would be complete.

In step 310, the coefficients for the vectors representing each of the models are vector quantized. In a preferred embodiment, a vector quantization is performed on the cepstral coefficients of the feature vectors representing the models (e.g., states) for the class. In a preferred embodiment, one purpose of step 310 is to cluster the speech information for each model into a common size matrix representation. Step 310 is performed since step 305 may produce a different number of feature vectors for each model because each phoneme may have a speech sample of a different time length. The vector quantization of step 310 results in a predetermined number of feature vectors for each model. Codebook size input 315 is an input to step 310 and represents the number of feature vectors to be determined in step 310.

Alternative to step 310, another embodiment of the present invention uses a fixed codebook (e.g., as used by a vocoder). When a fixed codebook size is used, each feature vector is quantized using the fixed codebook. This alternative embodiment allows indices of predetermined feature vectors to be stored in feature memory instead of storing feature vectors. Indices are preferably represented as an integer and require less storage space than storing feature vectors representing each class. Indices are used as an index into the codebook where feature vectors are preferably stored. Storing indices instead of feature vectors may be chosen when limiting the amount of memory is preferred over processing performance.

In step 320, a polynomial expansion for each of the vectors is performed. In a preferred embodiment, a high order polynomial expansion is performed on each vector representing each model. Preferably, the high order polynomial expansion is a fourth order polynomial expansion; although, other polynomial orders are suitable. Preferably, the polynomial order for the high order polynomial expansion performed in step 320 is determined from polynomial order input 322. Desirably, the polynomial order input 322 is in the range of 2 to 4. The results of step 320 are viewed as one matrix. When the cepstral order is 12 and cepstral coefficients are calculated, the high order polynomial expansion, when performed for each vector, produces a high order matrix of dimension codebook size input number of rows and 20,475 columns.

In step 325, vectors are combined to determine an individual model structure for each of the set of models. In a preferred embodiment, an individual model structure is determined by summing the feature vectors of the high order matrix determined in step 320. In a preferred embodiment, the individual model structure is calculated for each model (e.g., state). The result of step 325 is a single vector (e.g., individual model structure) of same dimension as a single vector of the high order matrix. In the embodiment having a high order matrix with the dimensions discussed in step 320, the resultant individual model structure (e.g., vector) has 20,475 elements.

In step 330, a total model structure is determined. In a preferred embodiment, a summation of each individual model structure is performed to determine the total model structure. Preferably, the summation is performed using the individual model structures determined in step 325.

In step 335, a combined model structure for each of the set of models is produced. In a preferred embodiment, the combined model structure, $r_{A,combined}$, for a model is determined by adding the total model structure (step 330) and a scaled version of an individual model structure associated therewith. For example, when a model, say model A, is trained for a phoneme (e.g., phoneme 1) and the class which includes model A is represented by 5 phonemes (e.g., phoneme 1, phoneme 2, . . . phoneme 5), the combined model structure representing model A is provided by equation (eqn.) 1, $$r_{A,combined} = r_{total} + ((N_{all}/N_1) - 2) * r_{A,model}, \quad \text{(eqn. 1)}$$

wherein, $r_{A,combined}$ is the combined model structure for model A, $r_{total}$ is the total model structure determined in step 330 for the combination of all phonemes being trained (e.g., phoneme 1, phoneme 2, . . . , phoneme 5), $N_{all}$ is a summation of the number of feature vectors representing each phoneme (e.g., the number of feature vectors for phoneme 1, phoneme 2, . . . , phoneme 5), $N_1$ is the number of feature vectors representing phoneme 1, $r_{A,model}$ is the individual model structure for model A determined in step 325. Preferably, scaling factor input 340 represents a scaling factor term (e.g., $((N_{all}/N_1) - 2)$) in eqn. 1.

In step 345, the combined model structure is mapped to a matrix for each of the models. In a preferred embodiment, a matrix representing a model, and therefore at least part of a predetermined class, is titled a model matrix. The model matrix for the $A^{th}$ model is represented as, $R_A$. Preferably, the method for mapping a combined model structure, $r_{A,combined}$, to a model matrix, $R_A$, is best illustrated as an example. Consider, for example, the case of a two element combined model structure, $r_{A,combined}$ in eqn. 2, $$r_{A,combined} = \begin{bmatrix} r_1 \\ r_2 \\ r_3 \\ r_4 \\ r_5 \\ r_6 \end{bmatrix}. \quad \text{(eqn. 2)}$$

The second order expansion (i.e., high order polynomial expansion) for eqn. 2 is provided in eqn. 3, $$r_{A,combined} = p_2(x) = \begin{bmatrix} 1 \\ x_1 \\ x_2 \\ x_1^2 \\ x_1 x_2 \\ x_2^2 \end{bmatrix}. \quad \text{(eqn. 3)}$$

A square model matrix having row and column dimensions is determined by eqn. 4, $$p(x)p(x)^t = \begin{bmatrix} 1 & x_1 & x_2 \\ x_1 & x_1^2 & x_1 x_2 \\ x_2 & x_1 x_2 & x_2^2 \end{bmatrix} = R_A, \quad \text{(eqn. 4)}$$

where $p(x)^t$ represents the transpose of vector $p(x)$.

Therefore, in a preferred embodiment, the mapping of the combined model structure to the model matrix is performed by copying the second order elements (high order polynomial expansion) found in eqn. 3 to the corresponding matrix element in eqn. 4. Again, for example, the $x_1 x_2$ element of eqn. 3 would map to the matrix elements having indices $R_A(3,2)$ and $R_A(2,3)$. The mapping approach described in step 345 can be extended to higher order systems.

In step 350, the matrix for each model is decomposed. In a preferred embodiment, a model matrix for the $A^{th}$ model (e.g., state), is decomposed using Cholesky decomposition. For example, the Cholesky decomposition for $R_A$ is represented in equation form in eqn. 5, $$L_A^t L_A = R_A, \quad \text{(eqn. 5)}$$

where $L_A^t$ is the transpose of matrix $L_A$ and both matrices are determined using Cholesky decomposition.

In step 355, each of the set of models is created. In a preferred embodiment, a model, $w_A$, is determined using back substitution. For example, eqn. 6 can be solved for $w_A$ (e.g., model A), $$L_A^t L_A w_A = ((N_{all}/N_1)-1)*a_A, \quad \text{(eqn. 6)}$$

where $L_A^t$, $L_A$, $w_A$, $N_{all}$, and $N_1$, are each described above. Preferably, $a_A$ is a low order model structure for the $A^{th}$ model. In a preferred embodiment, $a_A$ is determined using a method similar to the method for determining the individual model structure (step 325). The polynomial order for the low order model structure is preferably half the polynomial order for the individual model structure. Since the low order model structure elements are also elements of the individual model structure (step 325), the low order model structure may be determined directly from the individual model structure.

In an alternative embodiment, columns of $R_A$ and the corresponding element of $w_A$ may be eliminated. This operation reduces the number of classifier parameters yielding a smaller implementation.

In step 360, models are grouped to determine a series of states associated with each predetermined class. In the preferred embodiment, models which represent a predetermined class are grouped. Grouping the models effectively determines a series of states which represent the predetermined class. For example, for the word "happy", a model, and therefore a state, for each of the phonemes are grouped together. As described above, when each phoneme is represented by a state (e.g., S1, S2, S3, S4), the series of states identifies the associated word (e.g., happy). Therefore, during an identification method for a class, such as the method discussed below, a series of states determined for an unidentified class may be used to identify the class as one of a set of predetermined classes (e.g., the word "happy").

Additionally, in step 360, models representing the set of predetermined classes may be stored. In a preferred embodiment, a class model for a class is stored in a memory. Among other things, the memory may be a random access memory (RAM), a database, magnetic storage media such as disk or tape, read-only memory (ROM), and other types of suitable data storage.

Figure 4:
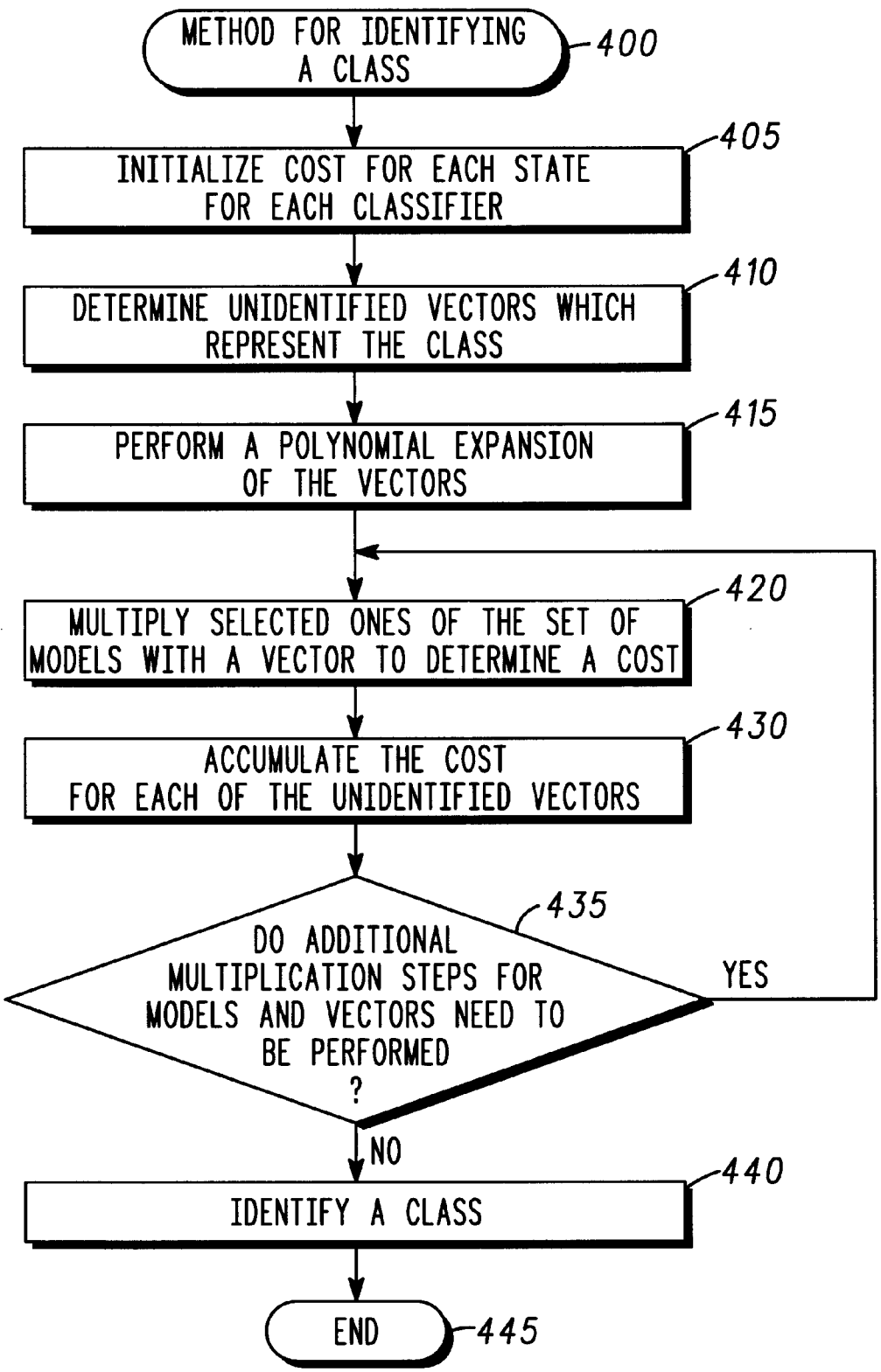
FIG. 4 is a flowchart illustrating a method for identifying a class as a predetermined class in accordance with a preferred embodiment of the present invention.

FIG. 4 is a flowchart illustrating a method for identifying a class as a predetermined class in accordance with a preferred embodiment of the present invention. In the preferred embodiment, method 400 is performed by a combination of classifiers and a comparator. Preferably, method 400 describes a method for identifying a class as at least one of a set of predetermined classes. Preferably, each of the set of predetermined classes is represented by at least one model. A suitable method for training (e.g., creating) models is described in method 300 (FIG. 3).

In step 405, the cost for each state for each classifier is initialized. In the preferred embodiment, each classifier includes a set of model multipliers. Preferably, each model multiplier represents one state for each of the series of states representing the class. For example, when a classifier includes models which represent the word "happy", the classifier uses four models (e.g., states) to represent the phonemes which in turn represent the word. In other words, one model multiplier includes the model for the phoneme "H", another model multiplier includes the model for phoneme "AE", and so forth for each phoneme. Since the selector accepts the observation cost generated by each model multiplier, the selector preferably initializes the cost associated with each model multiplier to zero.

In step 410, vectors representing an unidentified class are determined. In the preferred embodiment, feature vectors may be determined similar to the method for determining feature vectors in step 305 (FIG. 3).

In step 415, a polynomial expansion is performed for the coefficients for each of the vectors. In the preferred embodiment, a polynomial expansion is performed for the feature vectors determined in step 410. Preferably, the polynomial expansion performed in step 415 is similar to the polynomial expansion performed in step 320 (FIG. 3).

In step 420, selected ones of the set of models are multiplied with a vector to determine a cost. In the preferred embodiment, models for selected ones of the series of states representing a predetermined class are multiplied with an unidentified feature vector. Initially, a first model (e.g., first state) representing a predetermined class is multiplied by an unidentified feature vector. The selector preferably enables model multipliers to perform subsequent multiplication steps with subsequent unidentified feature vectors based on a trellis diagram. The observation cost for each "enabled" model multiplier is accumulated. For example, when a classifier includes models for phonemes which represent the word "happy", a first unidentified feature vector is multiplied with one of the models (e.g., the "state 1" model representing "H" in the word "happy" is activated by the selector, the selector enables model multipliers based on a trellis diagram for the predetermined class). The observation cost for the multiplication step is preferably accumulated by the selector for the associated state.

Again, for example, assume that the models for happy are represented by the phonemes "H", "AE", "P", "IY", respectively. Further assume that the unidentified feature vectors represent an "unidentified" class for the word "hat" (e.g., "H", "AE", "T"). When the first unidentified feature vector is multiplied by an "H" model for happy, the multiplication step generates an observation cost. The selector accumulates the observation cost for the respective states based on the trellis diagram for the predetermined class. In this example, the model multipliers associated with the "H" and the "AE" phonemes are the next likely models to produce the largest observation cost because operations performed by the classifiers maximize the observation costs for each unidentified vector.

In step 430, the cost for each unidentified vector is accumulated. In the preferred embodiment, the selector accumulates the observation cost for each unidentified feature for each state represented in each classifier.

In step 435, a check is performed to determined when additional multiplication steps need to be performed. In the preferred embodiment, when additional unidentified feature vectors need to be processed, steps 420–435 are performed. When no additional unidentified feature vectors need to be processed, step 440 is performed.

In step 440, a class is identified. In the preferred embodiment, an unidentified class is identified based on the total cost accumulated in step 430. Preferably, the predetermined class associated with the classifier which produces the largest total cost identifies the unidentified class.

It should also be noted that to those skilled in the art, the training and identification methods can be extended to use transition penalties.

Thus, among other things, what has been shown are a system and method for identifying classes from a collection of predetermined classes using limited processing and storage resources. What has also been shown are a system and method which can train a set of predetermined classes using limited processing and storage resources. What has also been shown are a system and method which combine observation cost and state information when identifying classes from a set of predetermined classes and training models which represent the set of predetermined classes. Also shown are a system and method for identifying an acoustic event. Also shown are a system and method for accurately modeling the probability that a certain sound emitted for text independent speaker verification is encapsulated in observation probabilities. What has also been shown are a system and method for modeling a global optimum that a certain sound has been emitted is encapsulated in observation probabilities.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for training a set of models by classifier and training system, each of the set of models representing at least part of a predetermined speech recognition class, the predetermined class being one of a set of predetermined classes, the method comprising the steps of:

associating vectors for the set of predetermined classes with at least one of a group of predetermined states, each of the group of predetermined states representing at least one of the set of models;

combining the vectors to determine an individual model structure for each of the set of models;

producing a combined model structure for each of the set of models based on the individual model structure; and creating each of the set of models based on the combined model structure and the vectors, the method identifying a class as at least one of the set of predetermined classes, wherein the method further comprises the steps of:

determining unidentified vectors which represent the class;

multiplying selected ones of the set of models with the unidentified vectors to determine a cost associated with each of the unidentified vectors;

accumulating the cost for each of the unidentified vectors to determine a total cost for the unidentified vectors; and identifying the speech recognition class by the classifier and training system as at least one of the set of predetermined classes based on the total cost.

2. A method as claimed in claim 1, further comprising the steps of:

vector quantizing coefficients for the vectors for each of the set of models; and performing a polynomial expansion of the coefficients for each of the vectors before performing the combining step.

3. A method as claimed in claim 1, further comprising the step of determining a total model structure based on the individual model structure for each of the set of models, and wherein the combined model structure for each of the set of models is further based on the total model structure.

4. A method as claimed in claim 1, further comprising the steps of:

mapping the combined model structure to a matrix for each of the set of models; and decomposing the matrix for each of the set of models, and wherein the creating step includes determining each of the set of models based on the matrix and the vectors.

5. A method as claimed in claim 1, further including the step of performing a polynomial expansion of coefficients for each of the unidentified vectors before performing the multiplying step.

6. A method as claimed in claim 1, wherein each of the group of predetermined states represents a phoneme.

7. A method as claimed in claim 1, wherein each of the set of predetermined classes represents a spoken word.

8. A method as claimed in claim 1, wherein each of the set of predetermined classes represents a digital image.

9. A method as claimed in claim 1, wherein each of the set of predetermined classes represents a radio signature.

10. A method as claimed in claim 1, wherein each of the set of predetermined classes represents a speaker.

11. A method for identifying a speech recognition class by classifier and training system as at least one of a set of predetermined classes, each of the set of predetermined classes being represented by at least one of a set of models, the method comprising the steps of:

determining unidentified vectors which represent the class;

multiplying selected ones of the set of models with the unidentified vectors to determine a cost associated with each of the unidentified vectors;

accumulating the cost for each of the unidentified vectors to determine a total cost for the unidentified vectors; and identifying the speech recognition class by the classifier and training system as at least one of the set of predetermined classes based on the total cost.

12. A method as claimed in claim 11, further including the step of performing a polynomial expansion of coefficients for each of the unidentified vectors before performing the multiplying step.

13. A method as claimed in claim 11, for training the set of models, each of the set of models representing at least part of a predetermined class, the predetermined class being one of the set of predetermined classes, the method comprising the steps of:

associating vectors for the set of predetermined classes with at least one of a group of predetermined states, each of the group of predetermined states representing at least one of the set of models;

combining the vectors to determine an individual model structure for each of the set of models;

producing a combined model structure for each of the set of models based on the individual model structure; and creating each of the set of models based on the combined model structure and the vectors.

14. A method as claimed in claim 13, further comprising the steps of:

vector quantizing coefficients for the vectors for each of the set of models; and performing a polynomial expansion of the coefficients for each of the vectors before performing the combining step.

15. A method as claimed in claim 13, further comprising the step of determining a total model structure based on the individual model structure for each of the set of models, and wherein the combined model structure for each of the set of models is further based on the total model structure.

16. A method as claimed in claim 13, further comprising the steps of:

mapping the combined model structure to a matrix for each of the set of models; and decomposing the matrix for each of the set of models, and wherein the creating step includes determining each of the set of models based on the matrix and the vectors.

17. A classifier and training system for identifying a speech recognition class as at least one of a set of predetermined classes, the class being represented by a plurality of unidentified vectors, each of the set of predetermined classes being represented by at least one of a set of predetermined models, each of the set of predetermined models representing a predetermined state, the predetermined state being one of a group of predetermined states, the system comprising:

a plurality of classifiers for receiving the set of predetermined models and the plurality of unidentified vectors and generating costs, wherein each of the plurality of classifiers is further comprised of:

a set of model multipliers for receiving models and unidentified vectors to generate the costs;

a selector for receiving the costs, enabling selected ones of the set of model multipliers based on the costs, and storing the costs in a memory; and a comparator coupled to each of the plurality of classifiers for comparing the costs generated from each of the plurality of classifiers and identifying the speech recognition class by the classifier and training system based on the costs.

18. A method for identifying a speech recognition class by classifier and training system as at least one of a set of predetermined classes, the method comprising the steps of:

representing each of the set of predetermined classes by at least one of a set of models;

training the set of models;

determining unidentified vectors which represent the class;

multiplying selected ones of the set of models with the unidentified vectors to determine a cost associated with each of the unidentified vectors;

accumulating the cost for each of the unidentified vectors to determine a total cost for the unidentified vectors; and identifying the speech recognition class by the classifier and training system as at least one of the set of predetermined classes based on the total cost.

19. A method as claimed in claim 18, further including the step of performing a polynomial expansion of coefficients for each of the unidentified vectors before performing the multiplying step.

20. A method as claimed in claim 18, wherein the training step further includes the steps of:

associating vectors for the set of predetermined classes with at least one of a group of predetermined states, each of the group of predetermined states representing at least one of the set of models;

combining the vectors to determine an individual model structure for each of the set of models;

producing a combined model structure for each of the set of models based on the individual model structure; and creating each of the set of models based on the combined model structure and the vectors.

21. A method as claimed in claim 20, further comprising the steps of:

vector quantizing coefficients for the vectors for each of the set of models; and performing a polynomial expansion of the coefficients for each of the vectors before performing the combining step.

22. A method as claimed in claim 20, further comprising the step of determining a total model structure based on the individual model structure for each of the set of models, and wherein the combined model structure for each of the set of models is further based on the total model structure.

23. A method as claimed in claim 20, further comprising the steps of:

mapping the combined model structure to a matrix for each of the set of models; and decomposing the matrix for each of the set of models, and wherein the creating step includes determining each of the set of models based on the matrix and the vectors.

* * * * *